United States Patent
Armbruster et al.

(10) Patent No.: US 7,321,768 B2
(45) Date of Patent: *Jan. 22, 2008

(54) ROAMING SERVICES USING HOME LOCATION REGISTER

(75) Inventors: Peter J. Armbruster, Chandler, AZ (US); Stephen D. Magee, Scottsdale, AZ (US); Bradley R. Schaefer, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 544 days.

This patent is subject to a terminal disclaimer.

(21) Appl. No.: 09/997,515

(22) Filed: Nov. 29, 2001

(65) Prior Publication Data

US 2003/0100303 A1    May 29, 2003

(51) Int. Cl.
*H04Q 7/20*    (2006.01)

(52) U.S. Cl. .............................. 455/432.1; 455/432.3; 455/433; 455/435.1; 455/439; 455/414.1; 370/310.2; 370/331; 707/104.1

(58) Field of Classification Search ............ 455/432.1, 455/432.2, 432.3, 439, 406, 414.2, 435.1, 455/410, 456.3, 433, 414.1, 418, 435; 370/310.2, 370/331; 707/104.1
See application file for complete search history.

(56) References Cited

U.S. PATENT DOCUMENTS

| | | | | |
|---|---|---|---|---|
| 6,108,540 | A * | 8/2000 | Sonti et al. ................. | 455/433 |
| 6,453,162 | B1 * | 9/2002 | Gentry ...................... | 455/433 |
| 6,754,482 | B1 * | 6/2004 | Torabi ........................ | 455/410 |

* cited by examiner

*Primary Examiner*—Joseph Feild
*Assistant Examiner*—Randy Peaches

(57) ABSTRACT

A distributed home location register (DHLR) (102-104) authorizes roaming services agreement electronically for a user (1) in a foreign network (120). A home network 100 has a network HLR 101 which records the roaming agreement and charges for billing user (1). A visitor location register (VLR) (122) then charges user (1) for services while in the foreign network (120) according to the roaming services agreement.

9 Claims, 1 Drawing Sheet

ROAMING SERVICES USING HOME LOCATION REGISTER

BACKGROUND OF THE INVENTION

The present invention pertains to communication system subscriber services and more particularly to maintenance and storage of subscriber (user) service profiles.

In existing cellular communications systems, user service profiles and subscription restriction agreements are currently stored in a centralized home location register (HLR). The HLR is typically a large database which is owned and configured by the network operator, the local telephone company. User service profiles include the kinds of services to which a user subscribes, for example, call waiting, call forwarding and three-way calling, etc. Subscription restriction agreements include those which govern functions such as roaming with a cellular phone. All such user information is commonly stored in a HLR which is maintained and configured by a telephone company.

Changes to the user's service profile are administered by the telephone company which provides the operation support system (OSS). Typically the HLR is a single function within each Public Land Mobile Network (PLMN). In order to affect changes the user must submit a service change request for either roaming services or basic subscription services or both. The restriction agreements governing roaming functions and others may be distributed among other HLRs in other Public Land Mobile Networks (PLMN) based on the service level agreement between the various telephone operations companies. The service level agreements allow each telephone operating company to generate revenue based on subscribers from foreign PLMNs who roam into their particular PLMN. Changes to restriction agreement must be administered by an operator of the OSS.

System operators have two choices for enabling roaming agreements with other operators. One choice is to establish signaling connections and billing clearinghouse arrangements with every other system operator for which they want a roaming agreement. This method is labor intensive and requires a large amount of time to establish roaming agreements with a large number of operators. The second choice is to use the services of an Interoperability Roaming Platform. These platforms provide a common signaling hub and billing clearinghouse functions that are shared among the operators who use the platform. Although this simplifies the number of operator relationships that must be created to enable roaming agreements, operators may still be required to establish arrangements with multiple platform providers.

A network operator often restricts the services that a roaming subscriber can execute in its network. These restrictions are communicated back to the roaming subscriber's HLR that manages these restrictions for the duration of the subscriber's presence in the foreign (visited) network.

The home network may restrict a subscriber's ability to roam into foreign networks.

Additionally, as new services are introduced, restrictions on these services must be added into the HLR record. It is possible that changes may be needed in either a Interoperability Roaming Platform or the visited network in order to correctly charge for these new services. These changes create additional delays in allowing subscribers to operate these services and lost revenue for network operators, since their roaming subscribers cannot execute these services soon after entering the service area.

Therefore, it would be advantageous to provide the mobile user or subscriber who desires to roam from one network operator to another and to establish roaming agreements upon entering another network operator's area is entered without complex interaction with the telephone company or long waiting periods.

DESCRIPTION OF THE PREFERRED EMBODIMENT

Figure 1:
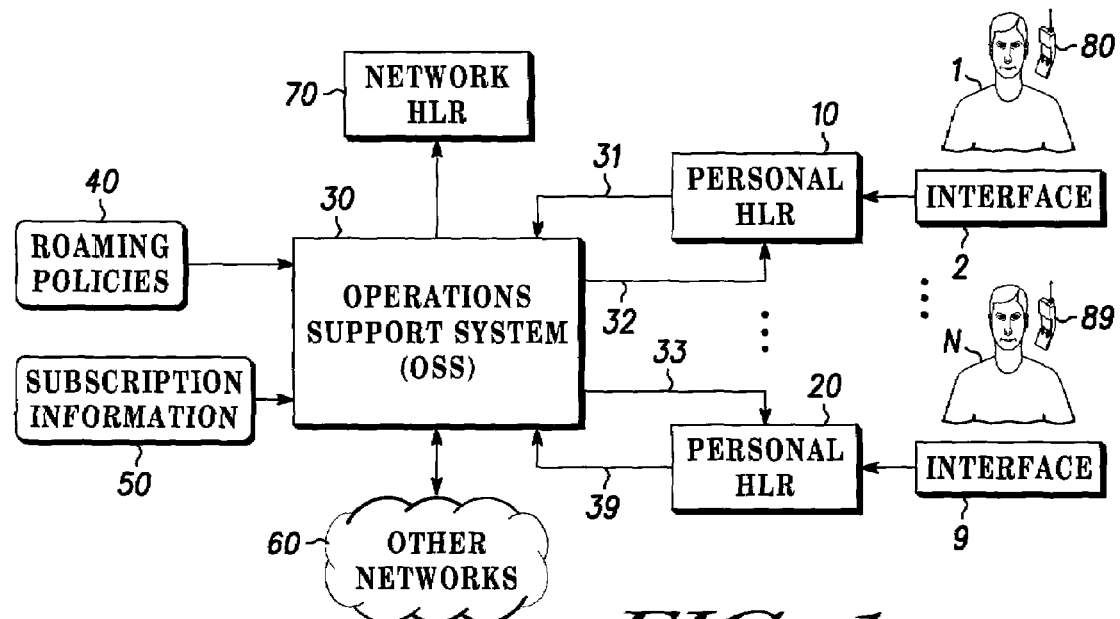
FIG. 1 is a block diagram of a user interaction with a distributed home location register (HLR) arrangement in accordance with the present invention.

FIG. 1 depicts a block diagram of a distributed or personal home location register arrangement. Instead of a common home location register (HLR) located in the telephone network system, each subscriber (user) 1 through N would have his or her own personal HLR 10-20. Personal HLRs 10-20 may include a home computer or other intelligent computing device connected to the internet. Each user 1-N maintains his or her personal HLR via interface 2-9. Each user or subscriber 1-N has an associated mobile communication device 80-89. For example, subscriber 1 will input through interface 2 the new features or changed service level agreements which he wishes to have into his personal HLR 10.

Personal HLR 10 then communicates with the operations support system (OSS) 30 of a telecommunication(s) service provider (telephone company) and transmits the feature or roaming changes required via link 31. Link 31 may be an internet link, wireless link or wire line interface. OSS 30 will then request roaming policies 40 or subscription information regarding feature changes 50. OSS 30 will perform the appropriate interfacing for billing associated with each of the feature changes and pass the provisioning information to personal HLR 10 via link 32. Link 32 may also be an internet link, wireless link or wire line interface. In addition, OSS 30 also changes the network HLR 70 for subscriber 1 such that the network HLR points to the personal HLR 10 for subscriber 1. As a result, when requests for features are made of the network HLR, the network HLR 70 will point to the personal HLR 10 which will contain the appropriate modified up-to-the-minute subscription and roaming information for subscriber 1.

OSS 30 may also receive service level agreement information from other PLMNs 60. Similarly, subscriber N will input changes through interface 9 to his personal HLR 20, for example, personal HLR 20 then passes on the changes to OSS 30 via link 33. Similarly, link 39 maybe an internet link, wireless link or wire line interface. OSS 30 then obtains current roaming policies 40 and subscription information 50 concerning whether the subscriber N has call waiting, call forwarding or other telephonic features. OSS 30 then transmits the authorized changes via link 33 to personal HLR 20. In addition, OSS 30 set the network HLR 70 for subscriber N to point to personal HLR 20.

In an alternate embodiment, some measure or possibly all the service content, provisioning information and roaming information may be stored on the personal HLR. New services can be downloaded from a source as the internet of the telephone system to the home computer by the subscriber without the need to configure the network to support these services. For example, a subscriber may wish to download a new service to their home computer that is not offered by the telephone company. The mobile subscriber could then execute the service from their mobile handset with their home computer acting as an external feature server to the network. Additionally, these subscriber specific services could be supported by an external feature server, with personal HLR containing a pointer to this external feature server.

As can be seen from the above explanation, this arrangement eliminates the need for the subscriber to request all changes through the telephone company's operator. This arrangement also allows subscription restrictions to be determined on a per feature basis. For example, a subscriber may wish to enable nationwide roaming prior to a business trip. The subscriber could modify the restriction in his personal HLR without operator intervention.

In another embodiment, this arrangement allocates the personal HLR to the feature service provider. In this instantiation of the invention, the feature's specific provisioning information typically stored in the HLR is now distributed to the HLR function associated with the feature service provider. Consequently, the network service provider HLR merely points to the feature service provider's HLR. Some or possibly all service content, provisioning information and roaming information which is required to operate this particular feature is stored on the feature service provider's HLR. The feature service provider may provision an act of a new service without the need to configure the network to support these services. As an example of roaming restrictions, a subscriber can now modify the restrictions on a per feature basis without impacting the network's HLR.

The distribution of the HLR function as described above provides the capability for a subscriber to directly modify restrictions, service profiles and agreements, and invoke new services without the intervention of an operator of the telephone company.

This invention can be added into existing networks through the use of network HLR 70. Since network HLR 70 routes all requests for a subscriber to their personal HLR (10-20), requests from foreign networks that have not implemented personal HLRs can be accommodated. Also, a PLMN can deploy both personal HLRs for some subscribers and network HLRs which use the traditional subscription management method for other subscribers, allowing for an orderly migration plan. This is termed a mixed mode deployment method.

Figure 2:
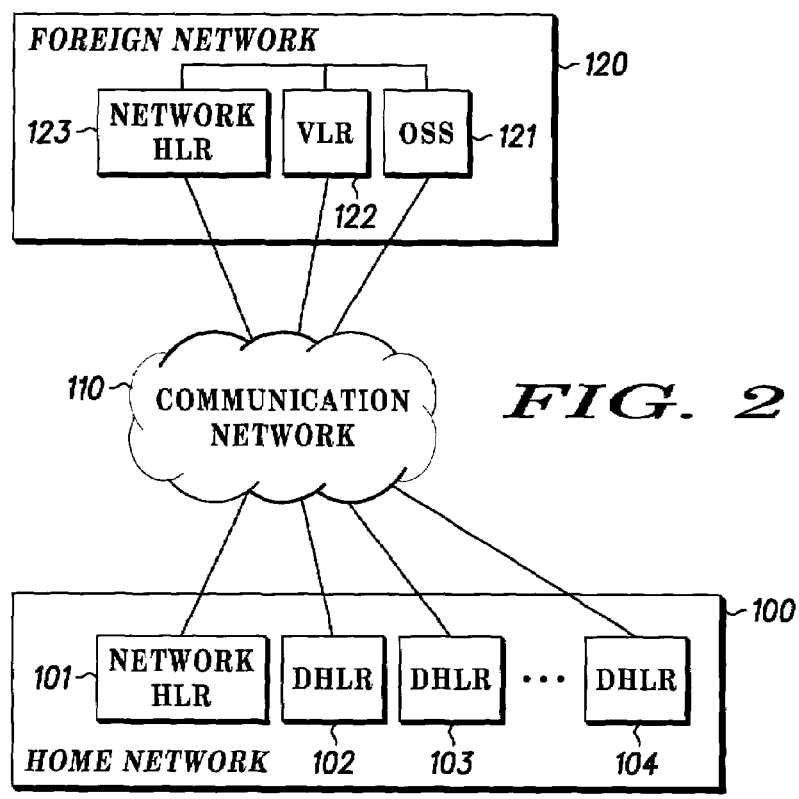
FIG. 2 is a block diagram of a distributed home location register (HLR) arrangement for roaming in accordance with the present invention.

FIG. 2 is a block diagram of a roaming agreement arrangement using distributed or personal home location registers (HLR). The personal or distributed HLRs (DHLRs, 102-104) by definition have a signaling interface through communication network 110. This is how the DHLRs (102-104) communicate with the network HLR 101. DHLRs 102-104 are able to communicate, as needed, with network elements Operations Support System (OSS) 121, visitor location register (VLR) 122 and HLR 123 in the foreign network 120. Communication between the DHLRs 102-104 and the foreign network 120 also allows the user of the DHLR 102, for example, to customize the billing clearinghouse functions, allowing the user to negotiate the most advantageous billing method (e.g. credit card, prepaid credit, debit account, etc.).

The distributed HLR 102 can then establish a roaming agreement by accepting the billing conditions of the foreign network 120. The roaming agreement negotiation may be accomplished through any number of methods, including electronically, as depicted herein. The electronically negotiated roaming agreement via the communication system 110 allows the user to immediately establish the roaming agreement, without network operator intervention. As the user roams in this foreign network 120 and others, the user is then directly billed for roaming or other services executed in the foreign network 120, and the appropriate roaming restrictions are imposed as necessary by the foreign network 120.

One of the advantages of the distributed HLR is its ability to quickly introduce new services. Since service restrictions are part of establishing roaming agreements, restrictions on operating these new services are part of a data record maintained in the DHLR 102 of user 1. Since the network HLR 101 no longer needs to be modified, the availability of these new services are immediate and under the direct control of the user. If the user does not want these services to be available when he roams, the user simply disables the services in his DHLR 102.

The flexibility of the distributed (personal) HLR further allows real time interaction with the user's mobile devices 80-89, in order to prompt user 1 to approve billing or new service requests in foreign network 120. When user 1 roams, for example, the foreign network 120 VLR 122 would query the DHLR 102 to determine what services, including roaming, to allow access (and bill for). The distributed DHLR 102 requesting approval by generating a message (e.g., via wireless packet data services, SMS, or others) to the user's 1 mobile device 80 requesting that user 1 approve the services and agree to the billing model required by the foreign network 120. The response from the mobile device 80 is sent back to the network HLR 101 and recorded. Then the service/billing agreement is sent to the VLR 122 of foreign network 120 for use by user 1 while he is in foreign network 120. This method has the effect of distributing the HLR function all the way to user 1 on his mobile device 80. There may be a pre-arrange agreement between the roaming services between the user 1 and the foreign network 120 which the home network 100 is aware of. The foreign network 120 then simply requests approval of the services to the user 1 or the DHLR 101 and the user 1 approves.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. An arrangement for services in a foreign network by a user of a home network comprising:
   the home network including:
      a first network home location register (HLR) coupled to a communication system; and
      a distributed home location register (DHLR) for storing a list of the services required by the user, said DHLR being directly coupled to the user via a mobile device;
   the foreign network including:
      a visitor location register (VLR) for determining an agreement for the services which are needed by the user in the foreign network; and
      a second network HLR coupled to the communication system;
   a mobile device of the user coupled to the foreign network for approving the agreement for the services; and
   a communication network for coupling the DHLR and the mobile device to the foreign network.

2. The arrangement as claimed in claim 1, wherein the DHLR is not located at a telecommunication services provider.

3. The arrangement as claimed in claim 2, wherein there is further included a plurality of users, each user of the plurality of users having a DHLR indicating which services are available to each user.

4. The arrangement as claimed in claim 3, wherein the first network HLR for a particular user includes a pointer to the DHLR for the particular user.

5. The arrangement as claimed in claim 1, wherein the DHLR includes means for requesting approval of the agreement by the mobile device.

6. The arrangement as claimed in claim 1, wherein the distributed home location register (DHLR) includes a computing device.

7. The arrangement as claimed in claim 1, wherein the communication network includes an internet connection between the DHLR and the foreign network.

8. The arrangement as claimed in claim 1, wherein the communication network includes a wireless connection between the DHLR and the foreign network.

9. The arrangement as claimed in claim 1, wherein the communication network includes a wire line connection between the DHLR and the foreign network.

* * * * *